United States Patent [19]

Kelley

[11] 4,065,877
[45] Jan. 3, 1978

[54] CONTAINER SYSTEM FOR PLANT HUSBANDRY

[76] Inventor: Albert W. Kelley, R.D. 1, Box 28, Creamridge, N.J. 08514

[21] Appl. No.: 741,470

[22] Filed: Nov. 12, 1976

[51] Int. Cl.$^2$ .............................................. A01G 9/02
[52] U.S. Cl. ...................................... 47/85; 206/423; 229/38
[58] Field of Search .................................. 47/84–87, 47/72–74; 206/149, 423; 229/37 R, 38, 39 R

[56] References Cited

U.S. PATENT DOCUMENTS

| 1,993,620 | 3/1935 | Otwell ..................................... 47/86 |
| 2,140,932 | 12/1938 | Avery ................................. 206/423 X |
| 2,885,140 | 5/1959 | Guyer ................................. 229/39 R |
| 3,208,478 | 9/1965 | Baines ............................ 229/39 R X |
| 3,375,607 | 4/1968 | Melvold ............................. 47/86 X |
| 3,660,934 | 5/1972 | Pollack et al. .................. 206/423 X |
| 3,846,936 | 11/1974 | Kelley .................................. 47/73 X |
| 3,931,694 | 1/1976 | Krikorian ............................. 47/87 |

FOREIGN PATENT DOCUMENTS

| 666,355 | 2/1952 | United Kingdom ................ 47/85 |
| 1,416,874 | 12/1975 | United Kingdom ................ 47/85 |
| 27,530 of | 1907 | United Kingdom ................ 47/85 |

*Primary Examiner*—E. H. Eickholt
*Attorney, Agent, or Firm*—Robert K. Youtie

[57] ABSTRACT

A container system for plant husbandry including a plurality of trays having removable partitions subdividing the trays into relatively small growing compartments, a plurality of open-ended tubes removably upstanding in said trays and having additional removable partitions subdividing the tubes into intermediate growing compartments, the tubes providing large growing compartments upon removal of the tube partitions.

9 Claims, 10 Drawing Figures

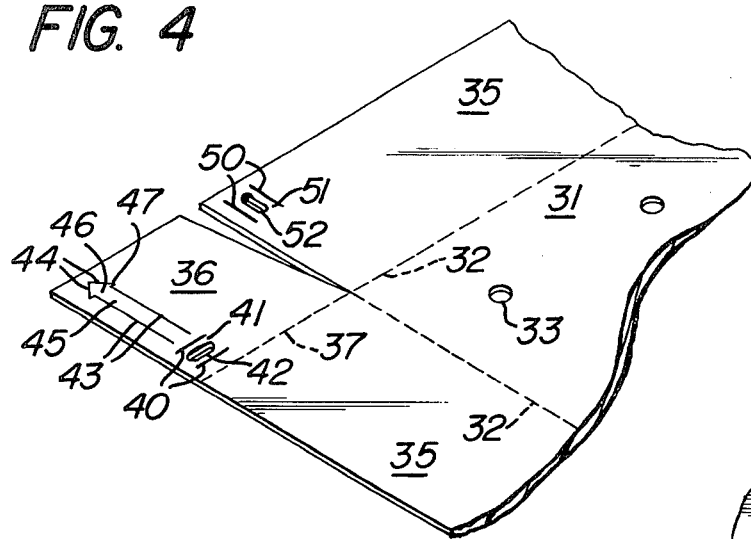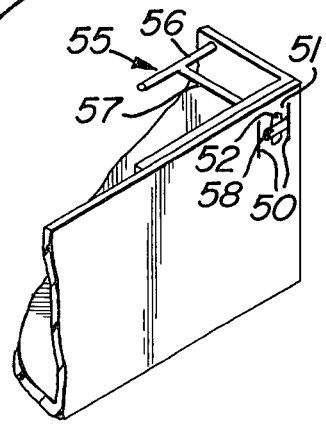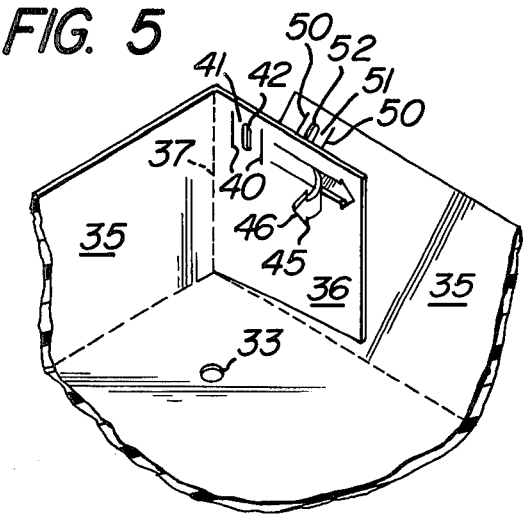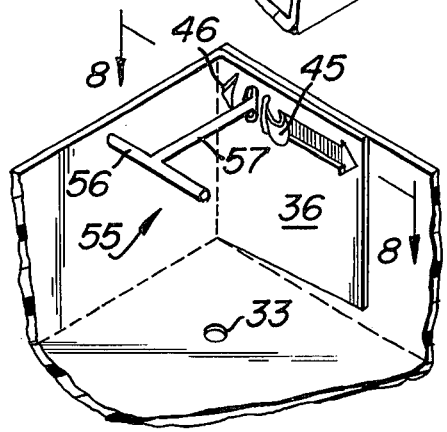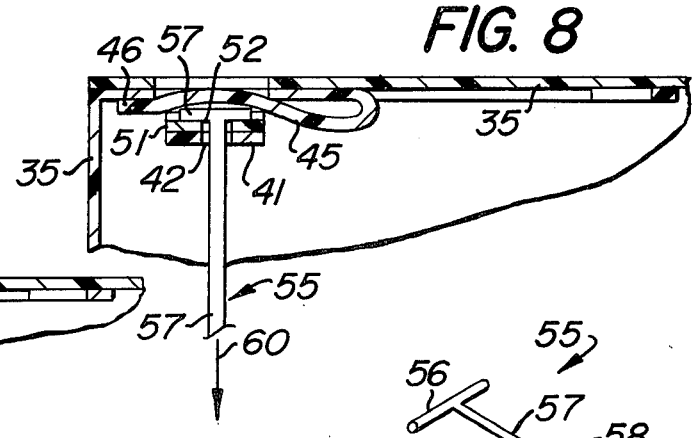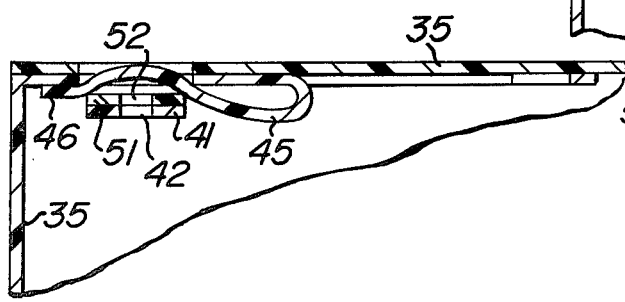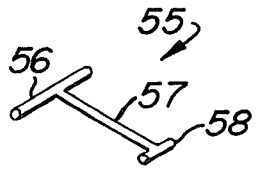

CONTAINER SYSTEM FOR PLANT HUSBANDRY

BACKGROUND OF THE INVENTION

As is well known to those versed in plant husbandry, high costs, as in the labor of repeated transplanting as plants grow, and for the required materials and supplies involved in repeated transplanting, and the rapid wear and deterioration of such supplies, has become oppressive, particularly to the commercial grower. Certain improvements toward reducing labor and materials costs have been made by my prior U.S. Pat. No. 3,846,936. However, there remains the need for additional reductions in labor and material costs.

SUMMARY OF THE INVENTION

It is, therefore, an important object of the present invention to provide a highly improved system of containers for plant husbandry, as in the sequential transplanting of growing plants, which system greatly facilitates the initial growing stage, germination or rooting from seeds, and subsequent successive transplanting to larger and larger compartments as required for continued growth.

It is still a further object of the present invention to provide a plant husbandry container system having the advantageous characteristics mentioned in the preceding paragraph, wherein the components thereof are highly interchangeable for use in different growing stages, extremely economical to manufacture as being adapted for mass production by automatic equipment, and wherein the system components are well adapted for repeated re-use to achieve additional economies.

The invention further contemplates the provision of a plant husbandry container system which may be conveniently and economically stored and shipped in a collapsed or knocked down condition to occupy minimum space while permitting of quick and easy set-up as desired, and wherein there is provided a unique fastening means well adapted for use in a wide variety of combinations and arrangements.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 4 is a fragmentary perspective view of the tray of the instant invention illustrating a corner construction thereof in a collapsed or knocked down condition.

FIG. 5 is a partial, internal perspective view showing an intermediate stage in erecting or setting up the corner construction of FIG. 4.

FIG. 6 is an external perspective view showing a slightly later stage in the erecting procedure of FIG. 5.

FIG. 7 is an internal perspective view showing the erection step of FIG. 6.

FIG. 8 is a partial sectional view taken generally along the line 8—8 of FIG. 7.

FIG. 9 is a sectional view similar to FIG. 8, showing the final erected condition.

FIG. 10 is a perspective view showing a tool of the present invention apart from the container system.

DESCRIPTION OF THE PREFERRED EMBODIMENT

Figure 1:
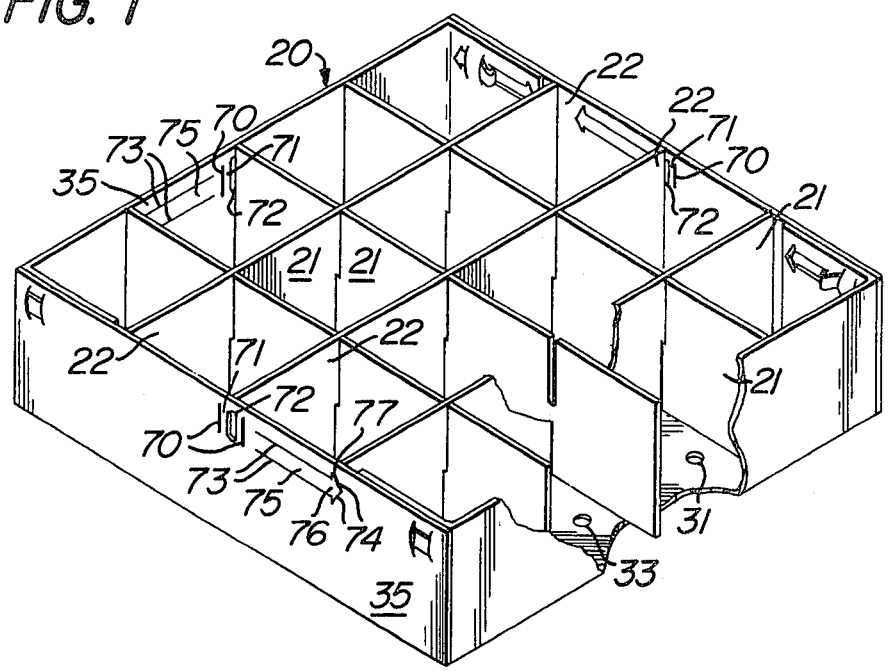
FIG. 1 is a top perspective view showing a tray of the present invention including tray dividers, partly broken away to illustrate interior construction.
Figure 2:
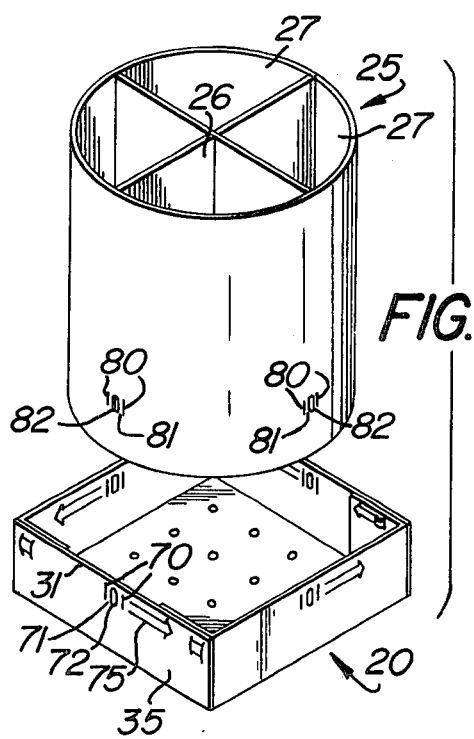
FIG. 2 is an exploded perspective view showing a tray of the present invention absent dividers and in association with an open-ended tube having internal partitions.
Figure 3:
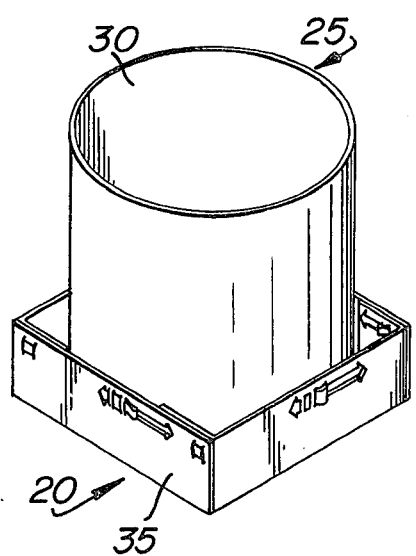
FIG. 3 is a perspective view showing the tray and tube of FIG. 2 in assembled relation, without the tube partitions.

Referring now more particularly to the drawings, and specifically to FIGS. 1–3 thereof, there is shown in FIG. 1 a generally rectangular, relatively shallow tray 20 provided interiorly thereof with a plurality of crossing internal partitions or dividers 21, subdividing the tray 20 into a plurality of generally rectangular, relatively small plant growing compartments 22.

The exploded assembly of FIG. 2 illustrates the generally rectangular tray 20 in position to receive a generally cylindrical, open-ended tube 25. In practice, the tray 20 may be substantially square, and the cylindrical open-ended tube 25 may be of a circular cross-sectional configuration sized to engage closely within the tray, with the tube generally tangent to the tray walls, as will appear more fully hereinafter. Interiorly of the tube 25 there is shown in FIG. 2 a pair of interfitting internal partitions or dividers 26 subdividing the tube into a plurality of intermediate size plant growing compartments 27. Of course, the several intermediate size plant growing compartments 27 are closed at their lower ends by the bottom wall of tray 20.

The assembly shown in FIG. 3 is that of tray 20 and open-ended tube 25, but without internal partitions or dividers 26, so that the tube 25 combines with the tray 20 to define a single relatively large plant growing compartment 30 for containing a larger plant.

More specifically, the tray 20 may advantageously be fabricated from a single integral sheet of foldable or bendable material, such as high density polyethylene, or other suitable material, cut and scored to form the tray. That is, there is formed of the integral sheet a generally square or rectangular bottom wall panel 31 bounded by a square or rectangular configuration of fold lines or scores 32, and formed throughout with a plurality of holes or perforations 33.

Extending from each fold line or score 32 is a generally rectangular side panel 35, longitudinally coextensive with its connecting score 32. Thus, the side panels 35 are each swingable or foldable approximately 90° upwardly about its adjacent hinged connection or fold line 32, so that the panels 35 define tray side walls, and the panel 31 defines the perforate tray bottom wall.

Additionally, at each tray corner or juncture of scores 32 and side walls 35, there is provided on one side wall end a corner flap 36 hingedly connected to said one side wall end, as by a fold line or score 37 defining the end of the carrying side wall. In the erecting procedure, each corner flap 36 is swung about its hinged connection 37 upwardly substantially normal to its associated side wall panel 35, and the several side wall panels are then swung upwardly, generally normal to the bottom wall 31, a condition shown in FIG. 5. It will there by observed that the corner flap 36 is disposed inwardly of and overlapping the inner side of the adjacent, noncarrying side wall 35.

Each corner flap 36 is formed with a pair of generally parallel cuts 40, which cuts may extend in parallelism with each other and with the adjacent hinged connection or fold line 37, the cuts 40 thereby defining therebetween a strip or strap 41 extending generally parallel to the adjacent score 37. The strip or strap 41 is advantageously formed with a through opening 42, which may be elongate longitudinally of the strip. Viewed otherwise, the material of flap 36 between cuts 40, defining strip 41, is provided with a through opening, hole or slot 42, which may extend longitudinally of and be spaced intermediate the pair of parallel cuts.

In addition, spaced from the strip 41, on the opposite side of the latter as adjacent score 37, the flap 36 is formed with a pair of parallel cuts 43 extending away from the strip 41 and terminating in convergent and meeting angulate cuts 44 remote from the strip 41. It will thus be observed that the pairs of cuts 43 and 44 combine to define of the flap material therebetween an elongate portion or strip 45 extending generally away from the strip 41 and having one end free, as at 46, the free end being enlarged by outstanding protuberances or points 47. The elongate strip 45 may be swung out of the plane of flap 36 about its inner end joined to the flap, as initially indicated in FIG. 5.

In addition to the strip formations 41 and 45 of flap 36, the adjacent side wall 35, not carrying the flap, is provided with a pair of generally parallel cuts 50 extending generally normal to the adjacent hinged connection 32 and defining a strip 51 between cuts 50 extending generally normal to the adjacent hinged connection 32. Also, a through opening or slot 52 is advantageously formed in strip 51, extending in parallelism with and spaced between the cuts 50. As will appear presently, the strips 41, 51 and 45 combine to define fastener means quickly and easily securing together adjacent side walls 35 at a meeting corner thereof.

In the initial stage of set-up, as shown in FIG. 5, the strips 41 and 51 of flap 36 and the adjacent facing portion of side wall 35 are in congruent overlying relation with each other, such that the through apertures or slots 42 and 52 may be in aligned registry.

Referring now to FIG. 10, there is illustrated a tool 55, including a handle 56 of elongate configuration, a shank 57 extending from a medial region of the handle, generally normal thereto, and a transverse enlargement or head 58 on the shank 57 remote from the handle. The shank end enlargement or head 58 may be of generally cylindrical formation, extending generally normal to the shank, and may be of a length and diameter for sidewise passage through an aligned pair of holes or slots 42, 52.

Referring now to FIG. 6, the tool 55 may be arranged to pass its head 58 through the aligned slots 42 and 52, from the inside outwardly through and beyond the outer strip 51, and then rotated one-quarter turn, to the position shown in FIG. 6. In this condition, slight manual retraction of the tool will displace both the overlying strips 51 and 41 inwardly beyond the plane of flap 36, to the condition shown in FIGS. 7 and 8. The elongate portion or strip 45 may then be doubled back, see FIGS. 7 and 8, and have its free end 46 woven through the aligned slots 40 and 50, beneath the inwardly offset strips 51 and 41. The enlarged head 46 may be sized for snug, one-way insertion past the overlying strips, the outstanding points or barbs 47 effectively preventing accidental retraction of the elongate strip from its interwoven relation. The tool 55 may then be again rotated 90°, and withdrawn through the aligned slots 42, 52, as shown by the arrow 60 in FIG. 8, leaving the fastened condition shown in FIG. 9. Thus, it will be apparent that the interfitting configurations of strips 41, 51 and 45 combine to define a convenient fastener means formed of the material of tray 20.

The several internal walls or partitions 21 may be of elongate, generally rectangular configuration, having edge notches for interfitting relation in the conventional "egg box" manner. Thus, the partitions or dividers 21 are freely insertable into and removable from the tray 20, providing in their inserted condition within the tray the plurality of relatively small growing compartments 22. Such compartments may be of suitable size for initial growing or rooting of seeds.

In addition to the cuts and scores described hereinbefore in connection with tray 20, the several side walls 35 are each provided at an intermediate or mid-region with an additional pair of generally parallel spaced cuts, as at 70 which extend generally normal to the upper and lower edges of the associated side wall and combine to define therebetween a generally vertically extending strip 71 of the intermediate side wall material. An elongate through opening or slot 72 is formed in each strip 71, extending in generally parallel, spaced relation between the associated cuts or slits 70. Also formed in each tray side wall 35 are a pair of vertically spaced, generally horizontally extending cuts or slits 73, which extend away from the adjacent pair of cuts 70, and terminate in convergent, meeting cuts or slits 74. The side wall material between adjacent cuts 73 and 74 defines an elongate strip 75 having an enlarged head 76 provided with outstanding projections or barbs 77.

The tubes 25 are also advantageously fabricated of an integral sheet of suitable material, such as high density polyethylene or other suitable material. Further, the tubes 25 may advantageously be seamless as by formation on tubular extruding apparatus. In fact, it has been found that both the tubes 25 and trays 20 may be substantially automatically die-cut from tubular extruded material, to achieve substantial savings in capital investment.

Preferably at four equiangularly spaced locations about the tube 25, there are formed a pair of parallel spaced cuts or slits 80 extending generally longitudinally of the tubular direction so as to define of the tubular material between the adjacent slits a longitudinal strip 81, extending generally normal to the end edges of the tube.

With the dividers 21 removed from tray 20, an open-ended tube 25 may be disposed with one end resting on the bottom wall 31 of the tray. In this condition, the tube 25 has its lower regions substantially tangent to the tray walls 35. Specifically, the several strips 81 of the tube 25 are each tangent to and comformably engageable with a respective strip 71 of the adjacent tray side wall 35. Therefore, the adjacent slots 72 and 82 are in aligned registry; and, the tool 55 may be used in the manner described hereinbefore to displace an overlying pair of strips 71 and 81 outwardly for interweaving therebeneath of the adjacent elongate strip portion 75. This condition is shown in FIG. 3.

In the assembly of FIG. 2, the internal partitions or dividers 26 may be of "egg box" interfitting relation and subdivide the tube 85 into a plurality of compartments 27 of an intermediate size, larger than that of compartments 22. More specifically, the compartments 27 are defined within the spaces bounded between the dividers 26, tube 25 and bottom wall 31 of tray 20. When relatively small plants have grown in the relatively small compartments 22 to become substantially rootbound therein, the plants may be lifted out and placed in the intermediate size compartments 27 with additional growing medium for continued growing. Of course, the bottom wall apertures 33 of the tray 20 afford drainage, while effectively preventing or limiting the passage therethrough of roots.

Upon continued growing in the intermediate size compartments 27, until the plants become substantially rootbound, they may be removed therefrom and placed in a tube 25, as in FIG. 3, with no dividers or partitions, and additional medium for growing. Further, a multitude of the hereinbefore described containers may be placed in side-by-side relation on soil or ground, either indoors or out, with little or no problem of deterioration, upsetting, spillage or the like. For example, the trays 20 may be disposed in contiguous side-by-side relation so as to most effectively utilize available space. Further, the rectangular configuration of trays 20 assures, even with relatively large plants in the condition shown in FIG. 3, that upsetting or overturning will not readily occur.

While it has been disclosed hereinbefore that the several cuts defining the interfitting fastener strips may be pre-formed, as in a factory, it is appreciated that such cuts may be formed in the field, if desired, by suitable portable die-cutting tools.

From the foregoing, it is seen that the present invention provides a container system for plant husbandry which greatly facilitates the handling procedures involved in transplanting of growing plants, both in commercial and domestic operations, affords containers of greatly enhanced reliability and durability, and substantially reduces the costs of both labor and materials involved in the growing and transplanting of plants.

Although the present invention has been described in some detail by way of illustration and example for purposes of clarity of understanding, it is understood that certain changes and modifications may be made within the spirit of the invention.

What is claimed is:

1. A system of containers for plant husbandry comprising a plurality of generally rectangular trays each having a perforated bottom wall and side walls about said bottom wall, and a plurality of intersecting dividers removably located in certain of said trays for subdividing each of said certain trays into a plurality of relatively small growing compartments for relatively small plants, a plurality of open ended tubes each upstanding from the bottom wall of one of the remaining trays and having spaced portions proximate to the tray side walls, and additional intersecting dividers removably located in certain of said upstanding tubes for subdividing each of said certain tubes into a plurality of intermediate growing compartments for intermediate size plants, the remainder of said upstanding tubes and associated trays each defining a relatively large container for a relatively large plant.

2. A system of containers according to claim 1, said trays and tubes being fabricated of impervious plastic sheet material.

3. A system of containers according to claim 1, in combination with tube fastening means fastening said tubes to said side walls.

4. A system of containers according to claim 3, said tube fastening means each comprising a pair of overlying slits cut in said tube and side wall, and a tab cut from the material of one of said tube and side wall for interweaving through said slits.

5. A system of containers according to claim 2, said trays each being fabricated of an integral sheet of folded material cut to define said bottom wall, said plurality of side walls folding upward from said bottom wall, corner flaps on said side walls each foldable inwardly to overlie the adjacent side wall, and corner fastening means on said corner flaps and the adjacent side wall portion.

6. A system of containers according to claim 5, said fastener means comprising a pair of overlying slits cut in each of said corner flaps and the adjacent side wall portion, and a tab cut from the material of one of said corner flaps and the adjacent side wall portion for interweaving through said slits.

7. A system of containers according to claim 6, in combination with tubular fastener means fastening said tubes to said side walls.

8. A system of containers according to claim 7, said tubular fastening means each comprising a pair of overlying slits cut in each of said tube and the adjacent side wall, and a tab cut from the material of one of said tube and said side wall for interweaving through said slits.

9. A system of containers according to claim 4, said tubes and side walls being formed in the material between said slits with tool receiving apertures for offsetting displacement by a tool to facilitate said interweaving.

* * * * *